(12) United States Patent
Bilek et al.

(10) Patent No.: US 10,409,659 B2
(45) Date of Patent: Sep. 10, 2019

(54) SYSTEMS AND METHODS FOR COMMAND MANAGEMENT

(71) Applicant: HONEYWELL INTERNATIONAL INC., Morris Plains, NJ (US)

(72) Inventors: Jan Bilek, Jihomoravsky kraj (CZ); Rick J. Born, Glendale, AZ (US); Martin Dostal, Olomouc (CZ); Pavel Kolcarek, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 240 days.

(21) Appl. No.: 15/460,505

(22) Filed: Mar. 16, 2017

(65) Prior Publication Data

US 2018/0267845 A1   Sep. 20, 2018

(51) Int. Cl.
| | |
|---|---|
| *G06F 9/46* | (2006.01) |
| *G06F 9/54* | (2006.01) |
| *G06F 9/451* | (2018.01) |
| *G06F 9/48* | (2006.01) |
| *G06F 9/50* | (2006.01) |

(52) U.S. Cl.
CPC .............. *G06F 9/546* (2013.01); *G06F 9/451* (2018.02); *G06F 9/4825* (2013.01); *G06F 9/4881* (2013.01); *G06F 9/5005* (2013.01)

(58) Field of Classification Search
None
See application file for complete search history.

(56) References Cited

U.S. PATENT DOCUMENTS

| 8,589,161 | B2 | 11/2013 | Kennewick et al. | |
|---|---|---|---|---|
| 8,744,645 | B1 | 6/2014 | Vaghefinazari et al. | |
| 2003/0139932 | A1* | 7/2003 | Shao | G06F 9/451 |
| | | | | 704/275 |
| 2013/0124550 | A1 | 5/2013 | Oel et al. | |
| 2014/0058584 | A1 | 2/2014 | Weng et al. | |

FOREIGN PATENT DOCUMENTS

EP   2523149 A2   11/2012

OTHER PUBLICATIONS

Extended EP Search Report for Application No. 18161617.8-1224 dated Jul. 18, 2019.

* cited by examiner

*Primary Examiner* — Wissam Rashid
(74) *Attorney, Agent, or Firm* — Lorenz & Kopf, LLP

(57) ABSTRACT

Systems and methods capable of increasing reliability of received commands across a variety of different kinds of input devices and modalities are provided. The provided systems and methods easily expand to support additional input devices, and easily adapt to a wide variety of command destinations, such as subsystems and components. The provided systems and methods employ command specific verification strategies before transmitting the command to its destination. The provided systems and methods also concurrently support a wide variety of command destinations, such as subsystems and components.

17 Claims, 3 Drawing Sheets

SYSTEMS AND METHODS FOR COMMAND MANAGEMENT

TECHNICAL FIELD

The technical field generally relates to command management systems, and more particularly relates to systems and related operating methods for managing commands received via multiple input devices employing different modalities.

BACKGROUND

User input devices have proliferated into a variety of different kinds that each employ a different mode of communication, or modality. Based, at least in part, on the state of the technology used for each modality, the reliability of the different kinds of user input devices is uneven. As used herein, the reliability of a user input device is a proxy for a confidence that a command received from a user input device reflects the user's intent. As a first example, a physical switch or lever is a user input device that a user must manipulate (and sometimes even break a glass cover to access) in order to provide input. The physical switch or lever employs a first tactical modality and is generally considered a highly reliable user input device. Another tactile modality is employed by a touch sensitive screen. In another example, a speech recognition device is a user input device that a user speaks into to provide input. The speech recognition engine employs a voice modality, and is generally considered to have a lower reliability than input devices utilizing tactile modalities. As is readily appreciated, a variety of other user input devices, with corresponding modalities, are available, each having a respective reliability.

When an input device is configured to provide a command to a system and the command is an "action command," meaning that it triggers an action by the system, the reliability of the input device may be relevant. Further, commands may be differentiated along a criticality scale between those that trigger rather trivial actions (non-critical commands) to those that trigger actions postulated to affect safety (highly critical commands). As may be apparent, a variety of activities may be considered an "action" responsive to an action command, and commands of higher criticality require more reliable input devices.

A technological problem is presented when a complex system is configured to concurrently receive user input from multiple different input devices of varying reliabilities. In this scenario, the complex system may comprise a plurality of subsystems, each responsive to multiple commands of varying criticality. To prevent these complex systems from triggering an action responsive to an unintentional command, conventional solutions often include a separate reliability component and verification strategy for each input device, which generally requires many interfaces, one dedicated to each user input device. Solutions of this type can be real estate intensive and unfavorably increase testing complexity and quality assurance procedures, any of which can be ominous for platforms that are sensitive to cost and weight.

Accordingly, systems and methods that address these technological problems are desirable. The desirable systems and methods easily expand to support additional input devices, and easily adapt to a wide variety of command destinations, such as subsystems and components. The desirable systems and methods employ command specific verification strategies before transmitting a command to its destination. The following disclosure provides an unconventional solution to these technological problems, in addition to introducing additional novel features.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A command management system is provided, the system comprising: a memory device; and a processor coupled to the memory device, the processor configured to: (a) determine a number of supported commands; (b) associate each supported command with a respective criticality level; (c) assign each input device of the plurality of input devices a respective reliability score; (d) receive a first received command from a first input device of the plurality of input devices; (e) generate a request reliability score for the received command based on the reliability score of the first input device; (f) compare the request reliability score to the criticality level associated with the first received command; (g) transmit the command responsive to determining that the request reliability score is >=the criticality level.

A method for a command management system is also provided, the method comprising: in a reliability engine, determining a number of supported commands; associating each supported command with a respective criticality level; assigning a respective reliability score to each input device of a plurality of input devices in communication with the reliability engine; receiving a first command from a first input device of the plurality of input devices; generating a request reliability score for the received command based on the assigned reliability score of the first input device; comparing the request reliability score to the criticality level associated with the command; and transmiting the command responsive to determining that the request reliability score is >=the criticality level.

In addition, an aircraft is provided, comprising: a plurality of user input devices; a command management system coupled to the plurality of input devices and to a plurality of command destinations, the command management system comprising a memory device, and a processor coupled to the memory device, the command management system configured to: (a) determine a number of supported commands associated with the command destinations; (b) associate each supported command with a respective criticality level; (c) assign each input device of the plurality of input devices a respective reliability score; (d) receive a first received command from a first input device of the plurality of input devices; (e) generate a request reliability score for the received command based on the assigned reliability score of the first input device; (f) compare the request reliability score to the criticality level associated with the first received command; (g) determine that the request reliability score is >=the criticality level, and transmit the command.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided command management system and method may take the form of a command management module (FIGS. 1, 104), and may be separate from, or integrated within, a preexisting mobile platform management system or aircraft flight management system (FMS).

As mentioned, when a command is received via any user input device among a plurality of different kinds of user input devices, a technological problem to be solved is determining whether the received command matches a user's intention before transmitting the command to its destination (command destinations are generally subsystems and components). In addition, depending upon the destination for the command and the action to be triggered, the command may have varying levels of criticality (for example, a subsystem that controls climate may respond to commands that have low criticality for an overall system and a subsystem that controls speed brakes may respond to commands that have a high criticality for the overall system). The below described command management system and method employ novel real time reliability scoring and criticality matching rules and algorithms to address these technological problems. The below description provides more detail as to these functions.

Figure 1:
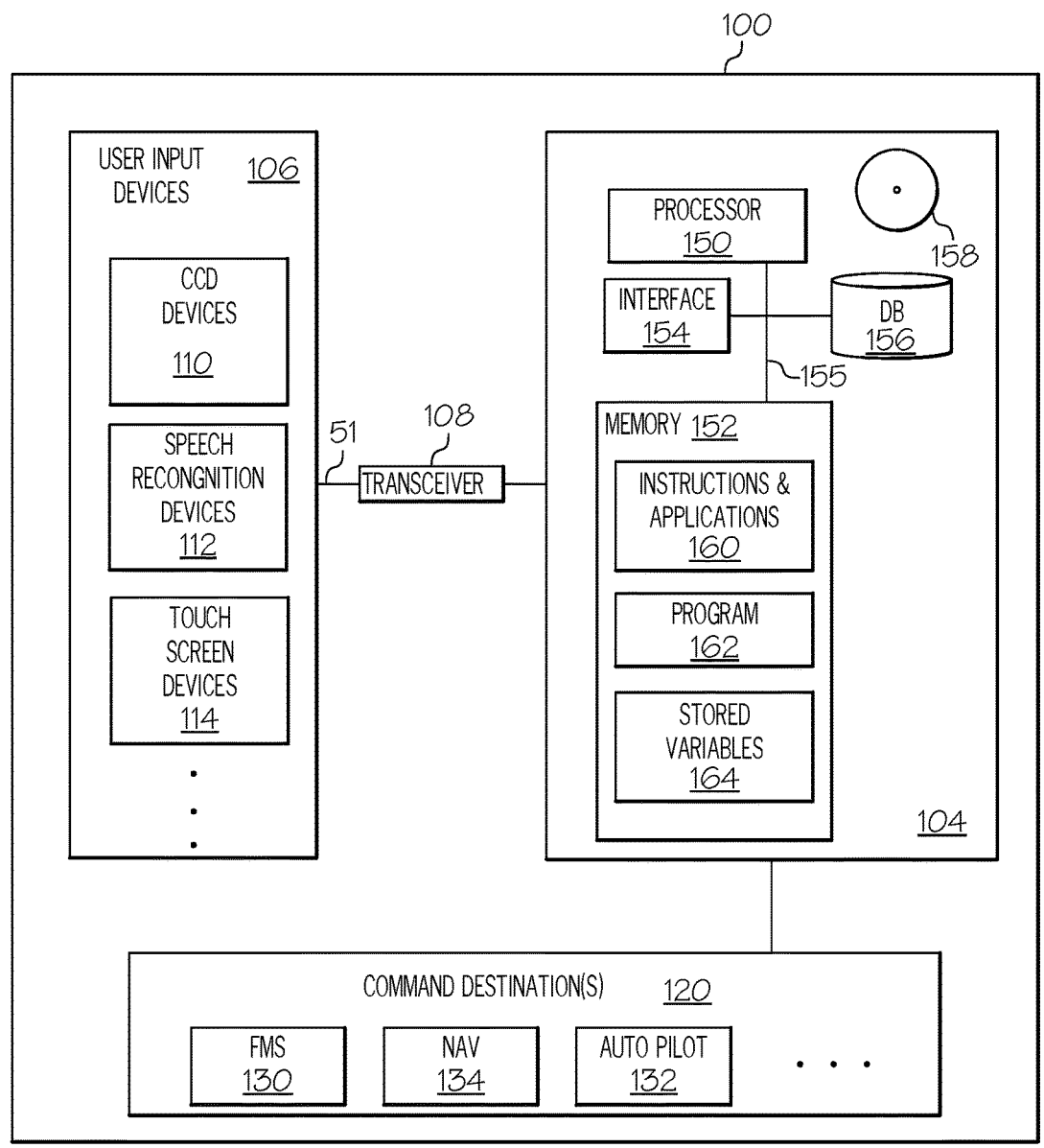
FIG. 1 is a functional block diagram illustrating a command management system, in accordance with various exemplary embodiments.

Turning now to FIG. 1, a functional block diagram of an aircraft 100 comprising a command management system 102 is depicted, in accordance with various exemplary embodiments. Although the depicted embodiment realizes the command management system 102 within the aircraft 100, the concepts presented here can be deployed in a variety of mobile and non-mobile platforms, such as vehicles, spacecraft, watercraft, buildings, open-air spaces, and the like.

In the depicted embodiment, the command management system 102 includes: a command management module 104 that receives commands from a plurality of user input devices 106, via bus 51 and transceiver 108. In operation of the aircraft 100, it is desirable to command and control a variety of subsystems and components, referred to herein collectively as command destinations 120. The command management module 104 transmits a command, via bus 53, to a command destination 120 responsive to satisfactory processing and transformation by the command management module 104. The operation of these functional blocks is described in more detail below.

As mentioned, commands are received from the user input devices 106. In various embodiments, the user input devices 106 include any one, or combination, of various known user input device devices, including, but not limited to: any cursor control device (CCD), such as a mouse, a trackball, or joystick; a keyboard; one or more buttons, switches, or knobs; a voice input system; and a gesture recognition system. In the embodiment depicted in FIG. 1, the user input devices 106 include cursor control devices (CCD) 110, speech recognition devices 112, and touch screen devices 114. Non-limiting examples of uses for the user input devices 106 include: entering values for stored variables 164, loading or updating instructions and applications 160 (including program 162), providing confirmations and/or cancellations for commands, and loading and updating the contents of the database 156, each of which is described in more detail below.

Regardless of the user input device 106, the command provided by each input device 106 is understood to have a time component that demarks the time at which the command was provided on bus 51, and may further carry with it context information, such as whether the respective user input device 106 is associated with a pilot, a crew, or the like. Context information may also be detected by the command management module 104. As may be readily appreciated, any combination of the variety of user input devices 106 may provide commands sequentially or concurrently. The command management system 102 is capable of continually: receiving commands, distinguishing among received commands, and transforming and processing them further, as described in more detail below.

The transceiver 108 may include at least one receiver and at least one transmitter that are operatively coupled to the command management module 104. The transceiver 108 can enable the command management module 104 to establish and maintain the communications links to onboard components (not shown), and the user input devices 106. The transceiver 108 can support wired and a variety of types of wireless communication, and can perform signal processing (e.g., digitizing, data encoding, modulation, etc.) as is known in the art. In some embodiments, the transceiver 108 is integrated with the command management module 104.

The subsystems and components comprising the command destinations 120 are application specific. There can be just one command destination 120 or a plurality of command destinations 120. When there is a plurality of command destinations 120, there may or may not be multiple of a given kind of command destination 120 (for example, multiple speakers). Bus 53 is used to transmit a command to its destination, and may be used to return communication back to the command management module 104. Bus 53, like bus 51, may represent wired or wireless communication. In FIG. 1, the command destinations 120 include, a flight management system (FMS) 130, an autopilot system 132, and one or more navigation systems (NAV) 134 (NAV 134 may include an area navigation RNAV, a lateral navigation LNAV, and a vertical navigation VNAV). In other embodiments, particularly those that are not avionics-related, additional destinations for commands may be added, and some of the above listed destinations may be deleted. Regardless of the type or the configuration of a given component with the command destination 120, each component within the command destination 120 is a subsystem or component that can be triggered to perform at least one action responsive to receiving a command.

The command management module 104 performs the functions of the command management system 102. With continued reference to FIG. 1, within the command management module 104, the processor 150 and the memory device 152 form a fusion engine and a reliability handling engine that perform the processing activities. In an embodiment, the fusion engine determines when one or more received commands are related and fuses them, and the reliability handling engine manages the verification strategies described herein. The fusion engine and reliability handling engine are collectively referenced herein as a "reliability engine" for simplicity. The reliability engine provides a technological improvement over limitations of conventional command management solutions, in part, by conditioning and filtering received commands with real time reliability scoring and criticality matching prior to transmitting a command. These concepts are described in more detail below.

The command management module 104 also includes an interface 154, communicatively coupled to the processor 150 and memory device 152 (via a bus 155), database 156, and an optional storage disk 158. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

A computer readable storage medium, such as a memory device 152, the database 156, or a disk 158 may be utilized as both storage and a scratch pad. The memory locations where data bits are maintained are physical locations that have particular electrical, magnetic, optical, or organic properties corresponding to the data bits. The memory device 152 can be any type of suitable computer readable storage medium. For example, the memory device 152 may include various types of dynamic random access memory (DRAM) such as SDRAM, the various types of static RAM (SRAM), and the various types of non-volatile memory (PROM, EPROM, and flash). In certain examples, the memory device 152 is located on and/or co-located on the same computer chip as the processor 150. In the depicted embodiment, the memory device 152 includes the above-referenced instructions and applications 160, the program 162, stored variables 164. Program 162 comprises rules and instructions sufficient to create, in cooperation with the processor 150, the reliability engine and the command management module 104. In various embodiments, the command management module 104 performs actions and functions in accordance with steps of the method 200 shown in FIG. 2.

The database 156 is a computer readable storage medium in the form of any suitable type of storage apparatus, including direct access storage devices such as hard disk drives, flash systems, floppy disk drives and optical disk drives. In one exemplary embodiment, the database 156 stores a lookup table that, for every command supported by the command management module 104, associates a criticality level with the command.

Figure 2:
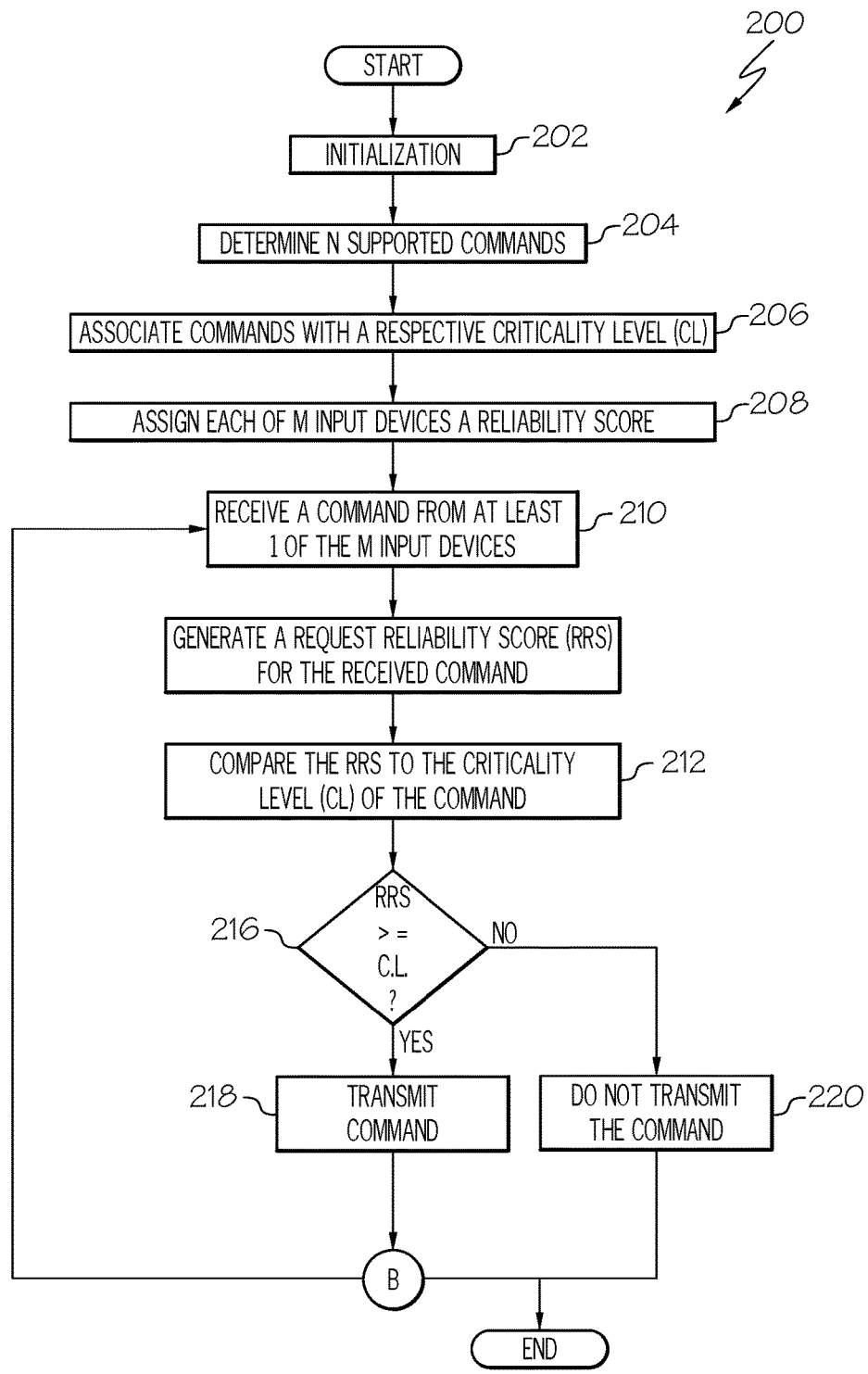
FIG. 2 is a flow chart describing a method for a command management system, in accordance with various exemplary embodiments.

As mentioned, commands for the various command destinations 120 may have various criticality levels associated with the action that they trigger. An assigned criticality level is used to distinguish safety-critical commands from non safety-critical commands; it is a value on a predefined scale, similar to various industry standard scales generated by standard setting groups. Examples of similar industry standard scales include a "Design Assurance Level" (DAL), and an Item Development Assurance Level (IDAL) scale. The criticality scale and the values along the scale may be application specific and predefined. In various embodiments, the criticality scale may be configured at an initialization step (FIG. 2 at 202). Non-limiting examples of a criticality scale include scales that have three levels: low (minimal effect), medium (significant impact), and high (hazardous effect), and scales that have five levels: low (no effect), medium-low (minor effect), medium (major effect), medium high (hazardous effect), and high (catastrophic effect).

As may be apparent at this point, each command may be distinguished by (i) the action that it triggers, and (ii) the destination or subsystem to which it is to be transmitted. The criticality level associated with each command may reflect (i) and/or (ii). In addition to an associated criticality level, supported commands may be further distinguished with respect to the nature of the action that they trigger. In various embodiments, each command may be further associated with one or more corresponding flags that indicate that the command has (i) immediate effect (IE flag), (ii) a significant impact (SI flag), and (iii) undo functionality (undo flag). In an embodiment, an asserted flag is a logical one and a deasserted flag is a logical zero, but other methods for differentiating these features may be employed. Therefore, in storage, in either memory device 152 or the database 156, a command table may look like Table 1, below. These flags may be employed to further condition a command before transmitting it to a command destination 120, their use is described in more detail in connection with the method steps in FIG. 3.

TABLE 1

Command Table Example

| Supported Command | Criticality | IE flag | SI flag | Undo flag | Command destination |
|---|---|---|---|---|---|
| Assert speed brake | High | 1 | 1 | 1 | FMS 130 |
| Display flight path | Low | 1 | 0 | 0 | NAV 134 |
| Disengage | High | 1 | 1 | 0 | Autopilot 132 |

The bus 155 serves to transmit programs, data, status and other information or signals between the various components of the command management module 104. The bus 155 can be any suitable physical or logical means of connecting computer systems and components. This includes, but is not limited to, direct hard-wired connections, fiber optics, infrared and wireless bus technologies. During operation, the program 162, stored in the memory device 152, is loaded and executed by the processor 150.

The interface 154 enables communications within the command management module 104, and can include one or more wired or wireless network interfaces to communicate with external systems or components. Interface 154 can be implemented using any suitable method and apparatus. For example, the interface 154 enables communication from a system driver and/or another computer system. In one embodiment, the interface 154 obtains a command from the user input devices 106 directly. The interface 154 may also include one or more network interfaces for communication with technicians, and/or one or more storage interfaces for connecting to computer readable storage, such as the database 156.

During operation, the processor 150 loads and executes one or more programs, algorithms and rules embodied as instructions and applications 160 contained within the memory device 152 and, as such, controls the general operation of the command management module 104 as well as the command management system 102. In executing the process described herein, such as the method 200 of FIG. 2, the processor 150 loads and specifically executes the program 162, to thereby realize an unconventional technological improvement to conventional command management systems. Additionally, the processor 150 is configured to process a received command, generate a request reliability score (RR Score) associated with the received command, reference the database 156 in accordance with the program 162, and transmit a command via bus 53 to a command destination 120 based thereon. In addition to being demarked with a time, each received command may optionally include context information, for example a flag or other indicator that the received command is coming from a pilot or coming from a crew.

As mentioned, the processor 150 and the program 162 form a reliability engine that continually, and in real time, (i) generates a request reliability score (RR score) for each received command, (ii) searches database 156 for the received command, and (iii) transmits the command only when the RR score is greater than or equal to a criticality level associated with the command. A method 200 for command management is provided in connection with FIG. 2.

It will be appreciated that command management system 102 may differ from the embodiment depicted in FIG. 1. As a first example, in various embodiments, the command destinations 120 can be any system or sub-system supporting a pilot while operating the aircraft 100. In addition, any combination of the user input devices 106 can be integrated, for example, as part of a console. Regardless of the state of integration of these systems, a user may control one or more features of the command management system 102 by providing user input via any user input device within the user input devices 106.

Referring now to FIG. 2 and with continued reference to FIG. 1, a flow chart is provided for a method 200 for a command management system 102, in accordance with various exemplary embodiments. Method 200 represents various embodiments of a method associated with the command management system 102. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and at 202 the command management module 104 is initialized. As mentioned above, initialization may comprise uploading or updating instructions and applications 160, program 162, stored variables 164, and the various lookup tables stored in the database 156. Generally, predetermined variables include, for example, the reliability and criticality scale values, any default times associated with determining that commands go together and/or that commands are verified for their command destination 120, and the like. In an embodiment, at 202, the method 200 initializes a command table, such as Table 1. Initialization also comprises determining or uploading a criticality scale and a reliability scale. At 204 a number N, of unique supported commands is determined. Recall, the unique supported commands are associated with the various components or subsystems within the command destinations 120. Determining the supported commands involve a configuration program contained within program 162, may involve loading supported commands into the command management module 104 at initialization, or may involve the command management module 104 individually assessing the command destinations 120 that are in communication with the command management module 104. At 206, each supported command is associated with a respective criticality level. As mentioned, the N commands may also be associated with an IE flag, SI flag, and undo flag, resulting in, for each supported command of a plurality (N) of supported commands, a row or line in the command table, such as is shown in Table 1 above. At 208, each user input device 106 (i.e., 110, 112, 114, etc.) is assigned with a respective reliability score. In some embodiments, the reliability score may match the criticality scale. In other embodiments, the reliability score is on a scale of different extent and/or demarcations from the criticality scale; in these embodiments, the program 162 comprises the instructions and rules to transform the reliability score for compatible use with the criticality scale.

At 210, a command is received by the command management module 104, from one of the user input devices 106. The command management module 104 (specifically the fusion engine) also recognizes when a command comprises a fusion of partial commands received from more than one of the user input devices 106. The command management module 104 recognizes that a first received command and a second received command are related, and fuses them. For example, the pilot could tap a waypoint on a touchscreen device 114 having a reliability score of 5, and speak "delete this waypoint" into a speech recognition engine having a reliability score of 2.

At 212, a request reliability score (RR Score) is generated. The RR Score is generated to represent the reliability that the received command matches the user's actual intention. For this reason, the RR Score is based on the reliability of the input device(s) of the user input devices 106 from which the received command was received. As mentioned, each user input device 106 may have a different modality and reliability score. When more than one user input device 106 and modality is used, the input device having the lowest reliability score prevails. In the example above, for "delete this waypoint," the reliability scores of the two input devices are compared. The lowest reliability score prevails for the command. The Request reliability score (RR Score) for the fused command is then 2.

At 214, the received command is located in the command table, and the request reliability score (RR Score) is compared to the criticality level (CL) for the command at 216. When the RRS is determined to be >=the CL, at 218 the command is transmitted to a command destination 120 (As denoted by the "A" in the method step 218, transmittal at 218 may be further conditioned upon events described in connection with FIG. 3, below). At 220 (when the RR Score is determined to be <the CL), the received command is not transmitted. In the example above, for "delete this waypoint," if the criticality level of the command "delete this waypoint" is 7, or anything over 2, the command will not be transmitted. After completion of 218 and/or 220, at "B," the process may return to 210 or end.

Figure 3:
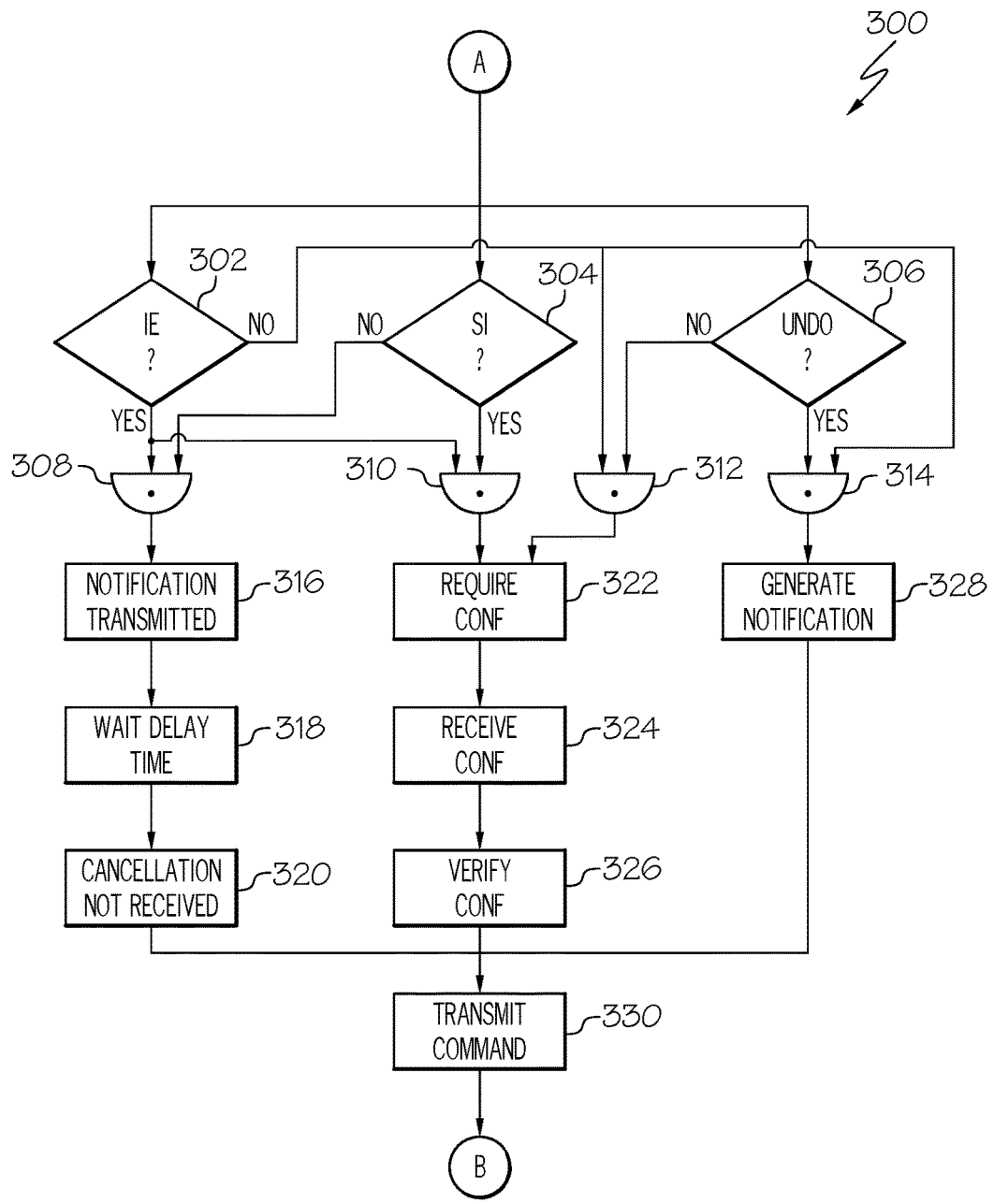
FIG. 3 is a flow chart showing an expansion of the method shown in FIG. 2, in accordance with various embodiments.

Turning now to FIG. 3, and with reference to Table 1, a flow chart showing an expansion "A" of the method step 218 is depicted, in accordance with various embodiments. As mentioned, transmittal of a command at 218 may be conditioned upon further events or determinations. Each of the paths depicted in FIG. 3 illustrate a different verification strategy for a received command. As described, the supported commands may vary from fairly trivial to extremely significant. The provided verification strategies illustrate an exemplary embodiment that distinguishes between commands; multiple other verification strategies may be implemented without straying from the novel concepts presented herein. At 302, it is determined whether or not the command has immediate effect (IE), at 304, it is determined whether or not the command has significant impact (SI), and at 306, it is determined whether or not the command has undo functionality. Each determination (302, 304, and 306) may have an associated predetermined definition that is stored in memory device 152, database 156, or uploaded during initialization at 202. For example, IE may be defined as happening in less than a second, and SI may be defined as a criticality level of high (or a seven out of ten). Further, these definitions may vary from command to command, and/or may be based on the command's destination 120. For commands determined to meet both of the conditions: (i) have IE, and (ii) do not have SI at 308, a notification of the command is transmitted to a user at a user input device (110, 112, 114) at 316, the method waits for a predetermined delay time to elapse at 318, and if a cancellation is not received (via 55) from the user at the end of the elapsed delay time, the command is transmitted.

At 314, if the received command is determined to meet both of the conditions: (i) does not have IE, and (ii) has undo functionality, a notification of the command is generated and transmitted to the user at a user input device (110, 112, and 114) at 328, and the command is transmitted to the command destination 120 at 330. In various embodiments, 328 and 330 may be in reverse order, or be concurrent.

When it is determined that the received command (a) meets both of the conditions: (i) has IE, and (ii) has SI (310), or that the received command (b) meets both of the conditions: (i) does not have IE, and (ii) does not have undo functionality (312), the method 300 may require a confirmation from the user that the command is intentional. Coming from 310 or 312, the type of confirmation required at 322 and the modality for the required confirmation for a command may vary, and variations may be command-specific or command destination 120 specific. In various embodiments, the confirmation may be required to be received via a high reliability user input device and/or modality, such as a hard button that has to be manipulated, rather than another voice command. A request for the confirmation from the user may be transmitted to a user input device (110, 112, 114). At 324, a confirmation of the received command is received, and at 326, if the received confirmation matches the requirements of the confirmation from 322, the confirmation is considered verified; the command transmitted at 330 only when the command is verified.

As is readily appreciated, the above examples are non-limiting, and many others may be addressed the command management module 104. Thus, command management systems and methods capable of increasing reliability of received commands over a wide variety of input devices and modalities have been provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 136 and containing computer instructions stored therein for causing a computer processor (such as the processor 150) to perform and execute the program 136. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A command management system, the system comprising:
   a memory device; and
   a processor coupled to the memory device, the processor configured to:
   (a) reference stored supported commands;
   (b) reference a predefined safety-critical scale to associate each supported command with a respective criticality level;
   (c) assign each input device of a plurality of input devices a respective reliability score;
   (d) receive a first received command from a first input device of the plurality of input devices;
   (e) generate a request reliability score for the received command based on the reliability score of the first input device;
   (f) compare the request reliability score to the criticality level associated with the first received command;
   (g) transmit the command responsive to determining that the request reliability score is >=the criticality level;
   determine whether the first received command has immediate effect;
   determine whether the first received command has more than a minimal safety effect, based on its criticality level; and
   determine whether the first received command has undo functionality.

2. The system of claim 1, wherein the processor is further configured to:
   transmit the first received command to a command destination responsive to the determination that the first received command meets both of the conditions: (i) does not have immediate effect, and (ii) has undo functionality; and
   generate and transmit a notification associated with the command.

3. The system of claim 1, wherein the processor is further configured to:
   responsive to determining that the first received command meets both of the conditions: (i) does not have immediate effect, and (ii) does not have undo functionality:
   receive a confirmation from a user input device responsive to requesting a confirmation of the first received command;
   verify the confirmation;
   and only transmit the first received command responsive to the verified confirmation.

4. The system of claim 1, wherein the processor is further configured to:
   responsive to determining that the first received command meets both of the conditions: (i) has immediate effect, and (ii) has more than a minimal safety effect:
   receive a confirmation responsive to requesting a confirmation of the first received command;
   verify the confirmation;
   and only transmit the first received command responsive to the verified confirmation.

5. The system of claim 1, wherein the processor is further configured to:
   responsive to determining that the first received command meets both of the conditions: (i) has immediate effect, and (ii) does not have more than a minimal safety effect:
   transmit a notification of the first received command to a user interface; and
   transmit the first received command only upon the condition that a cancellation is not received within a predetermined delay time after transmission of the notification of the first received command.

6. The system of claim 1, wherein the processor is further configured to:
   receive a second received command from a second input device of the plurality of input devices; and
   responsive to determining that the first received command and the second received command are related, (i) generate the request reliability score further based on the assigned reliability score of the second input device, and (ii) repeat (f)-(g).

7. The system of claim 3, wherein the processor is configured to verify the confirmation of the command by comparing a required reliability score with a reliability score of a user input device from which the confirmation came.

8. The system of claim 7, wherein the user input device providing the confirmation of the command is a touch screen device.

9. A method for a command management system, the method comprising:
in a reliability engine,
referencing stored supported commands;
associating each supported command with a respective safety-criticality level from a predefined safety-critical scale;
assigning a respective reliability score to each input device of a plurality of input devices in communication with the reliability engine;
receiving a first command from a first input device of the plurality of input devices;
generating a request reliability score for the received command based on the assigned reliability score of the first input device;
comparing the request reliability score to the safety-criticality level associated with the command; and
transmitting the command responsive to determining that the request reliability score is >=the safety-criticality level;
receiving a second command from a second input device of the plurality of input devices; and
responsive to determining that the first received command and the second received command are related, generating the request reliability score further based on the assigned reliability score of the second input device.

10. The method of claim 9, further comprising
determining whether the first received command has immediate effect;
determining whether the first received command has more than a minimal safety effect, based on its criticality level; and
determining whether the first received command has undo functionality.

11. The method of claim 10, further comprising:
responsive to determining that the first received command meets both of the conditions: (i) does not have immediate effect, and (ii) has undo functionality:
transmitting the first received command to a command destination; and
generating and transmitting a notification associated with the first received command.

12. The method of claim 10, further comprising:
responsive to determining that the first received command meets both of the conditions: (i) does not have immediate effect, and (ii) does not have undo functionality:
receiving a confirmation of the first received command;
verifying the confirmation of the first received command;
and only transmitting the first received command responsive to the verified confirmation.

13. The method of claim 10, further comprising:
responsive to determining that the first received command meets both of the conditions: (i) has immediate effect, and (ii) has more than a minimal safety effect, based on its criticality level:
receiving a confirmation of the first received command;
verifying the confirmation of the first received command;
and only transmitting the first received command responsive to the verified confirmation.

14. The method of claim 10, further comprising:
responsive to determining that the first received command meets both of the conditions: (i) has immediate effect, and (ii) does not have more than a minimal safety effect, based on its criticality level:
transmitting a notification of the first received command to a user interface; and
transmitting the first received command only upon the condition that a cancellation is not received within a predetermined delay time after transmission of the notification of the first received command.

15. An aircraft, comprising:
a plurality of user input devices;
a command management system coupled to the plurality of input devices and to a plurality of command destinations, the command management system comprising a memory device, and a processor coupled to the memory device, the command management system configured to:
(a) reference stored supported commands associated with the command destinations;
(b) associate each supported command with a respective criticality level from a predefined safety-critical scale;
(c) assign each user input device of the plurality of user input devices a respective reliability score;
(d) receive a first received command from a first user input device of the plurality of user input devices;
(e) generate a request reliability score for the received command based on the assigned reliability score of the first input device;
(f) compare the request reliability score to the criticality level associated with the first received command;
(g) determine that the request reliability score is >=the criticality level, and transmit the command;
determine whether the first received command has immediate effect;
determine whether the first received command has a significant impact; and
determine whether the first received command has undo functionality.

16. The aircraft of claim 15, wherein the command management system is further configured to:
responsive to determining that the first received command meets both of the conditions: (i) does not have immediate effect, and (ii) has undo functionality:
transmit the first received command to a command destination; and
generate and transmit a notification associated with the command.

17. The aircraft of claim 15, wherein the command management system is further configured to:
upon determining that the first received command:
(a) meets both of the conditions, (i) does not have immediate effect, and (ii) does not have undo functionality, or
(b) meets both of the conditions: (i) has immediate effect, and (ii) has more than a minimal safety effect, based on its criticality level,
verify a confirmation of the first received command;
and only transmit the first received command responsive to verifying the confirmation.

* * * * *